United States Patent
Williams et al.

(10) Patent No.: US 6,445,155 B1
(45) Date of Patent: Sep. 3, 2002

(54) MOTOR CONTROL

(75) Inventors: Andrew James Stephen Williams; Anthony Walter Burton, both of Solihull (GB)

(73) Assignee: TRW Lucas Varity Electric Steering Ltd., West Midlands (GB)

( * ) Notice: Subject to any disclaimer, the term of this patent is extended or adjusted under 35 U.S.C. 154(b) by 0 days.

(21) Appl. No.: 09/656,468

(22) Filed: Sep. 6, 2000

(30) Foreign Application Priority Data

Sep. 7, 1999 (EP) .............................................. 9920988

(51) Int. Cl.$^7$ ................................................ H02P 1/24
(52) U.S. Cl. ..................... 318/727; 318/811; 318/599; 318/798; 318/815; 318/439; 318/434
(58) Field of Search ................................ 318/727, 811, 318/599, 798, 815, 439, 434, 432, 430, 138, 254

(56) References Cited

U.S. PATENT DOCUMENTS

| | | | |
|---|---|---|---|
| 4,528,486 A | | 7/1985 | Flaig et al. |
| 4,879,502 A | | 11/1989 | Endo et al. |
| 5,274,317 A | | 12/1993 | Utley et al. |
| 5,436,545 A | | 7/1995 | Bahr et al. |
| 5,483,141 A | * | 1/1996 | Uesugi ........................ 318/811 |
| 5,986,417 A | * | 11/1999 | Nocolai et al. ............. 318/798 |

FOREIGN PATENT DOCUMENTS

| | | | | |
|---|---|---|---|---|
| EP | 0599260 A1 | | 6/1994 | |
| GB | 2176068 A | * | 2/1983 | ............. H02P/6/00 |
| GB | 2157901 A | * | 4/1984 | ............. H02P/6/00 |
| GB | 2235098 A | * | 8/1989 | ............. H02P/6/00 |
| GB | 2266816 | | 3/1992 | |
| GB | 2266816 A | | 11/1993 | |

OTHER PUBLICATIONS

Bouzekri, H. et al.: "Influence of Current Observers on the Performances of a PMSM Supplied by Hysteresis Current Controlled VSI", Control In Power Electronics. Brighton, Sep. 13–16, 1993, Proceedings of the European Conference on Power Electronics and Applications, London, IEE, GB, vol. 4, Conf. 5, Sep. 13, 1993, pp. 359–362, XP000427100.

Acarnley, P.P.: "Current Measurement in Three-Phase Brushless DC Drives", IEE Proceedings B. Electrical Power Applications, Institution of Electrical Engineers. Stevenage, GB, vol. 40, No. 1, Part B, 1993, pp. 71–79, XP000304285.

* cited by examiner

Primary Examiner—Karen Masih
(74) Attorney, Agent, or Firm—Tarolli, Sundheim, Covell, Tummino & Szabo L.L.P.

(57) ABSTRACT

A method of monitoring the operation of a brushless motor is disclosed. The method comprises the steps of monitoring the current flowing into or out of the windings of the motor using a current measurement circuit to produce an output signal indicative of the current; measuring the output of the current measurement circuit when the instantaneous current flow through the current measurement circuit is known to be substantially zero; and producing a modified output signal which is compensated for any differences between the actual measured output signal value and an ideal output signal value. The method enables any drift in the output signal to be compensated "on-line" whilst the is running.

24 Claims, 4 Drawing Sheets

MOTOR CONTROL

This invention relates to improvements in motor control strategies, and to motor control and drive circuits incorporating such improved strategies. It especially relates to improvements in motor control strategies for motors in electric power assisted steering systems, although wider applications are envisaged.

Electric motors are becoming increasingly common parts of everyday machines. One area of great interest is the use of an electric motor to apply an assistance torque to a portion of a steering column shaft in order to make the steering wheel of a vehicle easier to turn. By sensing the torque demanded by the driver as the steering wheel is turned, a motor drive signal can be produced which in turn drives a motor connected operatively to the steering column. The motor applies a torque of the same sense as the driver demand to the steering column.

To meet the demands for smooth torque and precise motor drive characteristics, it is known to provide an electric motor comprising a brushless rotor having a number of permanent magnets which rotates within a stator comprising a number (typically three) of phase windings. The phase windings are connected together in a delta or a star arrangement and can be controlled using pulse width modulated signals applied to switching devices in a bridge circuit.

In order to accurately control the motor a measurement of the current flowing in the motor, which enables motor torque to be determined, must be made. It has been proposed that a number of current sensing resistors provided in the motor drive circuit can be employed to take the motor current measurement. A single resistor is provided in series in each phase of the motor, the voltage developed across each resistor being proportional to the current flowing through the resistor. However, this necessitates the need for multiple current sensing circuits, one per resistor.

Alternatively one current sensing resistor could be eliminated since it is known that the algebraic sum of the currents flowing in all phases of the motor must equal zero. Therefore for an n phase motor, (n−i−) current sensing resistors and circuits would be needed.

In an alternative, it has been proposed that only a single sense resistor is used. This configuration reduces cost and component count and is not susceptible to measurement inaccuracies that can occur when two or more sense resistors are used, due to different component and sensing circuit tolerances associated with each current sensor. More accurate motor control can be achieved if measurements are made with precise timing, and offset voltages present in the current measuring circuitry are eliminated. Such a single sense resistor is typically placed in the circuit so as to measure the total instantaneous current flowing between a D.C. power supply and the bridge circuit and motor combination.

In accordance with a first aspect, the invention provides a method of monitoring the operation of a brushless motor comprising a number of phases each comprising one or more windings connected in a bridge circuit, the bridge circuit comprising a number of arms with one arm for each phase, each arm comprising a top switching device connected between the phase and a first supply voltage and a bottom switching device connected between the phase and a second, different, supply voltage, each device being switchable from an on state to an off state the method comprising the steps of: monitoring the current flowing into or out of the bridge circuit and motor using a current measurement means to produce an output signal indicative of the current; measuring the output of the current measurement means when the instantaneous current flow through the current measurement means is known to be substantially zero; and producing a modified output signal which is compensated for any differences between the actual measured output signal value and an ideal output signal value.

By switched on we mean that the switching device presents a low impedance to the arm and switched off we mean that it presents a high impedance to the arm.

By monitoring the output of the current measurement means corresponding to the instant when the current in the current measurement means is known to be zero, any offset or drift in the output signal from the current measurement means can be detected and compensated. If required, the output signal can then be reset to zero to produce the modified output value. This can be achieved by generating an offset value substantially equal in magnitude to the actual measured value. This can be added to or subtracted from the actual measured value to force the modified output signal to zero for zero current flow (or some other "ideal" value) by comparing the actual output to the ideal output. Indeed, the intention is that the compensating value can then be subtracted from any output signal value (even for non-zero currents) to compensate for any zero-offset.

By measuring the output of the current measurement means at instants when the current flowing through the current measurement means is known to be zero whilst the motor is running, the output may be compensated "on-line" whilst the motor is running. By this, we mean that, if desired, the measurements can be taken whilst the motor is operating in any one of its operating quadrants, i.e. motoring, braking etc. This provides increased flexibility over a system where compensation is made when the motor is switched off. For instance, a more regularly updated compensating value can be obtained without waiting for the motor to be switched off. This is especially useful where the motor forms a part of an electric power steering system, as the zero current measurements can be made periodically or randomly whilst the vehicle is being driven and, for example, the motor is producing torque whether rotating or otherwise.

The method may include a step of adding the offset value to the output signal from the current measurement means, or subtracting the offset value from the output signal value of the current measurement means to produce the modified output signal.

The method is especially suited to monitoring three phase motors although it may be adapted to control motors having more than three phases. The method may further include steps of controlling the motor by applying suitable signals to each switching device to vary the average voltage applied to each phase of the motor whilst also allowing the zero current measurement to be made.

The respective signal applied to each switching device may comprise a pulse width modulated signal. Preferably all the switching devices are modulated by respective pulse width modulated signals that have the same synchronised modulation cycle time.

Preferably, the signals are chosen so that during each or selected pulse width modulation cycles the instantaneous current into or out of the bridge circuit is zero at a first instant independent of the net current in the cycle. This enables a zero measurement to be made when the motor is running, regardless of the overall net motor current.

The preferred pulse width modulated signal applied to each switching device is defined by a single ON-OFF transition and a single OFF-ON transition or edge within each cycle.

The location of the ON-OFF edges within a or each cycle are preferably chosen so that all the top devices are switched on whilst all the bottom devices are switched off at the same time for at least a first instance within each period. This ensures that zero overall current flows into or out of the bridge circuit, and hence through the current measurement means during each period at that first instance. The current measurement means output at this instance can be monitored to produce the actual zero current measurement.

Alternatively, the edge positions are chosen so that at the first instance all the top switching devices are switched off whilst the bottom switching devices are switched on. This also ensures that zero current flows into or out of the bridge circuit, and hence through the current measurement means.

Of course, it is not essential that it is always possible to take a zero current reading during every cycle although this is preferred and does offer the advantage that a regularly updated offset value can be obtained.

The net voltage applied to each phase of the motor during a cycle depends on the duty period of the pulse width modulated signal applied to each switching device. Most preferably, within each cycle the top device is switched on for a period substantially equal to the length of time in which the bottom device is switched off and vice versa, each device being switched from ON to OFF and vice versa only once during each modulation cycle.

Most preferably, during a single cycle the top device is first switched from an initial off state at the start of the period to an on state. It then remains in the on state for a period dependent upon the phase voltage demand. It is then switched back to the off state until the end of the cycle. The entire waveform in one cycle is therefore defined by one on event (or edge) and one off event (or edge).

During the same single cycle, the bottom switching device may be initially in the on state at the start of the cycle. It is then switched to the off state where it remains off for a predetermined time dependent upon the phase demand voltage before being switched back on until the end of the cycle. The entire waveform in one cycle is therefore defined by one off event (or edge) and one on event (or edge).

Most preferably, the method may include the step of aligning the signals for each switching device whereby the on periods of each top switching device and the off periods of the bottom switching device (or vice versa) during each cycle are centre aligned so that the two edges of each signal are spaced equally either side of an arbitrarily chosen point in the cycle. Preferably, they are centred around the centre of the cycle. This ensures that the centre point will correspond to all top switching devices on and all bottom switching devices off, thus defining a suitable point for taking a sample of the output signal from the current measurement means when zero current is flowing through the current measurement means.

In the case of a 3-phase motor, the method may further comprise, after centre aligning the signals, shifting the edges of one or more of the signals within the cycle so that they are overlapped in a manner suitable to enable two precisely timed samples to be taken from the current measurement means, each corresponding to the current in a different single phase of the motor. Knowing that the algebraic sum of the phase currents in a 3-phase motor is zero, measuring the current in 2 phases allows the current in the third phase to be calculated and hence the current in all three phases to be known. Preferably, the signals for the top and bottom switching device in a phase are not shifted relative to each other.

Provided that such shifts allow two phase currents to be measured under all conditions of 3-phase PWM duties, the 3-phase currents can always be measured and hence a closed loop control of the 3-phase currents in the motor can be performed by adjusting the 3 phase PWM duties to control the 3 phase currents to demanded values. Of course, it is important that the duty cycle for each pair of signals is not substantially altered by this shifting, so that the average voltage applied to each phase of the motor remains substantially constant.

Depending on the actual signals in any cycle, it may be possible to align the signal edges so that a sample of zero current can be made when all top switching devices are off and all bottom switching devices are on, as well as a sample when all the top switching devices are on and the bottom switching devices are off. Where possible, the method includes the step of aligning the signal edges in this manner. If it is not possible, one or more error flags may be raised indicating that a zero current sample can not be taken within that cycle.

By way of the present invention, during pulse width modulated control of a motor the various duty cycles can be aligned (where possible) so as to force brief periods in which zero current flows in the current measurement means. The zero current sample can then be taken at these instants. Of course, it is not essential to the invention to take samples of every cycle of the pulse train. Indeed, since priority needs to be given to the non-zero samples needed by the modulation scheme to measure the individual phase currents, such samples may not always be available. However, those skilled in the art will readily appreciate the advantages of being able to compensate for drift in the current measurement circuit whilst the motor is running.

According to a second aspect, the invention provides a method of controlling a motor comprising three phases, each phase being connected to a first voltage through a top switching device and to a second voltage through a bottom switching device, the method comprising the steps of:

calculating a respective phase voltage demand value for each phase of the motor indicative of the net voltage to be applied to the phase;

calculating the duty period value of a pulse width modulated signal for the top switching device and the duty period value of a pulse width modulated signal for the bottom switching device of each phase needed to apply a net voltage to the phase corresponding to the voltage demand value;

processing the duty period value to define for each phase the time delay between a first switching edge for the top switching device where it is switched from an off state to an on state and a second switching edge for the top switching device where it is switched back to the off state and the time delay between a third switching edge for the bottom switching device where it is switched from an on state to an off state and a fourth switching edge for the bottom switching device where it is switched back to the on state, the position of the edges defining a cycle of a PWM signal;

calculating the positions of the edges of the signals for one phase relative to the edges of the signals for the other phases so that at a first instance the current flowing through the current measurement means is indicative of the current in a single phase of the motor and at a second instance the current flowing through the current measurement means is indicative of the current flowing in a second, different, phase; and modulating each switching device with its respective PWM signal.

Preferably, the edges within a PWM cycle are positioned relative to each other so that at a third instance substantially zero current is flowing through the current measurement means. This may correspond to an instance where all the top switching devices are switched on whilst the bottom switching devices are switched off. Additionally, or alternatively, the edges may be aligned so that at a fourth instance all the top switching devices are switched off whilst the bottom switching devices are switched on. This enables two different zero current conditions to be created in the PWM cycle.

Where possible, the edges are positioned relative to one another so that all four instantaneous conditions set out above are met within a PWM cycle. Obviously, this will depend on the phase voltage demand values as to whether this is possible.

By respectively taking two zero current samples, one when all the top switching devices are switched on and all the bottom switching devices are switched off and the other when the bottom switching devices are switched on, and all the top switching devices are switched off two streams of data corresponding to zero current can be generated. Each stream can be separately filtered and then averaged to allow a compensating value to track changes in the zero output of the current measurement circuit.

It is preferred to use a single pole low-pass recursive filter having a fixed time constant for each stream. The average of the two streams can then be used to calculate the zero current output value.

The method may comprise an intermediate step of initially centre aligning each PWM signal within a PWM cycle so that the first and second edges (or third and forth edges) of the signal are spaced equally about an arbitrarily chosen point in the PWM cycle. This is preferably the centre of the PWM cycle.

The method may comprise the further step of taking at least one current sample during a PWM cycle corresponding to either of the first, second, third or fourth instants.

Most preferably, a sequence of such current samples are taken from within a single PWM cycle, the sequence consisting of one sample from each the first, second, third and fourth instants.

When calculating the time delay between the PWM edges for each signal, one or more interlock delays may be added to the position of each edge. Otherwise, the top switching device is generally switched to be in the on state for a duration substantially equal to the time in which the bottom switching device is in the off state and vice versa.

The three phases are preferably arranged in order of the magnitude of their associated phase voltage demand, the highest being labelled phase A, the lowest phase C.

After initial centre aligning of the edges, the position of the edges can then be shifted so that current measurements can be made. Ideally, the edges are shifted so that at a first instant the top and bottom switching means of one phase are in the opposite state to those of the remaining phases. At a second instant, the top and bottom switching devices of a different phase are in a different state to the top and bottom switching means of the remaining phases. This allows the current flow into or out of the phase having the unique switching state to be measured by measuring the current flowing into or out of the phases.

The edges are preferably shifted in two stages. Firstly, the two signals for phase A may be shifted relative to the signals for phase C, either by shifting the edges for phase A forward (earlier) in the PWM cycle, or the edges for phase C backwards (later) in the PWM cycle or a combination of both until the top switching device of phase A is on whilst the top switching device of phase C is switched off for a minimum overlap time. The edges for phase B may then be shifted either forward or backward in the PWM cycle until a position is reached where both the current flowing into Phase A and the current flowing out of Phase e can be uniquely measured.

It will be clear to those skilled in the art that this produces a first instance in which the current measured will be equal to the current flowing into phase A, and a second instance where the current measured will be equal to the current flowing out of phase C. Of course other shift patterns are envisaged in which the currents at the first and second instants correspond to the current into or out of other phases.

The measured value of current may then be used as the feedback term for a feedback controller designed to control the current in the phases. The current values for A and C are re-allocated to the physical phases in reverse of the ordering procedure previously described.

According to another aspect, the invention provides an electric power steering system incorporating a motor which is monitored using a method according to the first aspect of the invention and/or controlled using a method according to the second aspect.

There will now be described, by way of example only, one embodiment of the present invention with reference to the accompanying drawings of which:

FIG. 3($b$) shows the two signals applied to the top and bottom transistors in a phase of the motor when the phase demand voltage is at a minimum net value;

FIG. 1 is a circuit diagram of the motor drive and control circuitry for an electric power assisted steering system incorporating the motor control strategy of the present invention.

Figure 1:
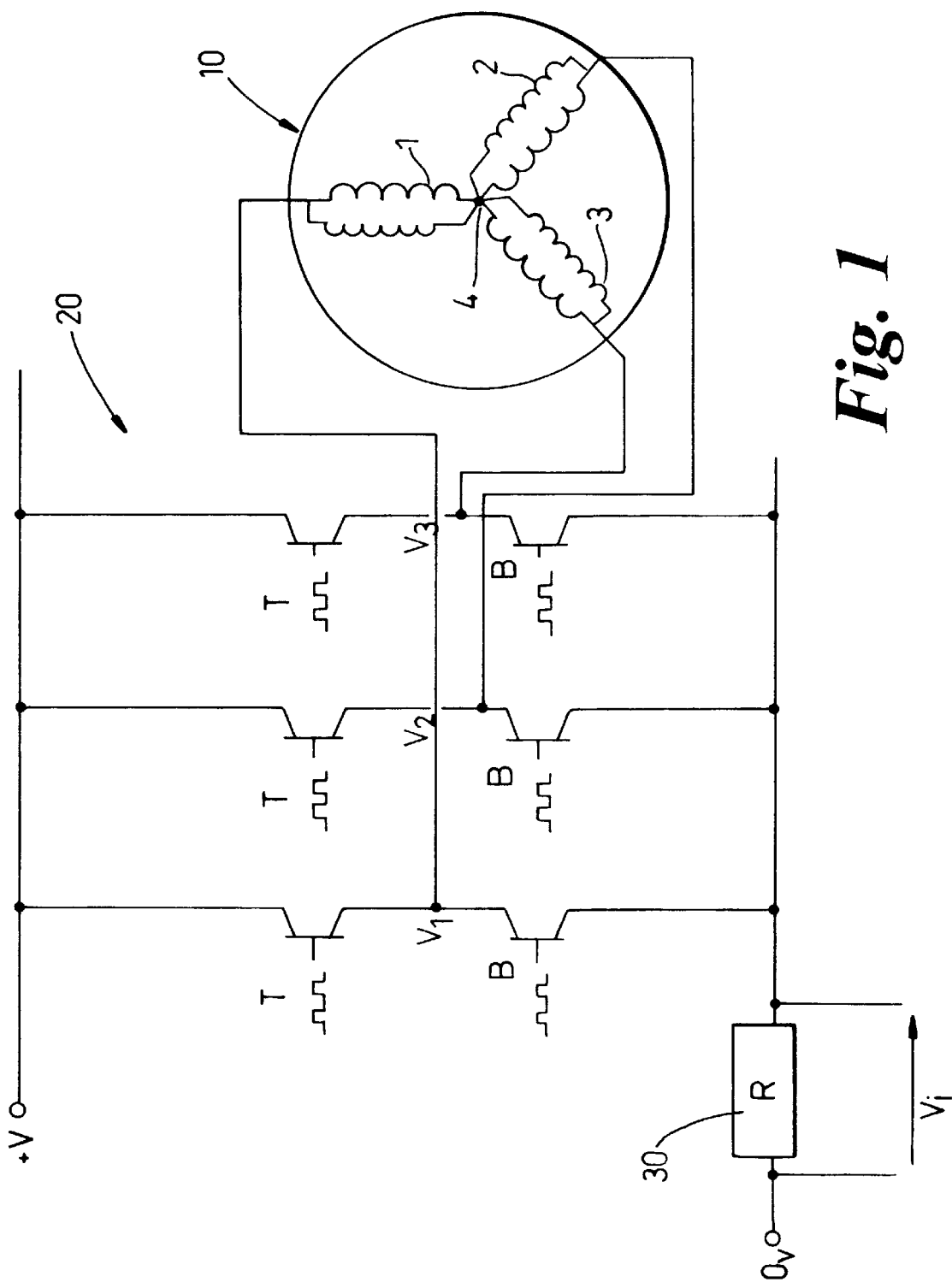
FIG. 1 is an overview of an electric motor and drive circuit incorporating a current sense resistor circuit which forms part of an electric power assisted steering system in accordance with the invention.

The motor comprises a brushless permanent magnet motor 10 having three phases (1, 2 and 3), each comprising one or more phase windings connected in parallel. For ease of explanation, the phases are referred to hereinafter as phase 1, phase 2, and phase 3 respectively. The phases are connected at one end at a star point 4 and at the other end to a bridge circuit 20. Although a star connected motor is described the technique could also apply to a delta connected motor. The bridge circuit 20 consists of an array of switching devices in the form of power transistors ($T_1$, $T_2$, $T_3$, $B_1$, $B_2$, $B_3$,). For each phase 1,2,3 a top transistor $T_1$, $T_2$, $T_3$, connects the phase to a positive supply +V and a bottom transistor $B_1$, $B_2$, $B_3$, connects the phase to a zero voltage supply 0v. In a conventional vehicle, the positive supply is typically provided by a battery, with the negative connection being made to a part of the vehicle chassis which is connected to the battery negative terminal.

Each transistor has a high resistance when switched off and a low resistance when switched on. By applying a signal to the base of each transistor, the appropriate net voltage can be applied to each phase to operate the motor. The control of the switches is governed by a control strategy in accordance with the invention.

The circuit also includes a filter circuit (not shown) between the battery and the switching devices, and a current sense resistor 30 provided in series between the motor bottom transistors and the earth connection. The potential drop across the resistor 30 can be measured using a suitable circuit (not shown) to provide a measure of the current flowing into or out of the bridge and the motor windings.

Each transistor is switched using a respective PWM signal applied to its base. The duty period of the PWM signals determines the net phase voltages V1, V2 and V3 applied to each phase. The duration of each PWM cycle is fixed.

The PWM signal applied to each transistor is calculated using a motor control strategy that employs a vector control algorithm implemented in software. This is a closed loop algorithm which generates three phase voltage demand signals based upon the current in each phase as measured by the current sense resistor circuit.

Figure 2:
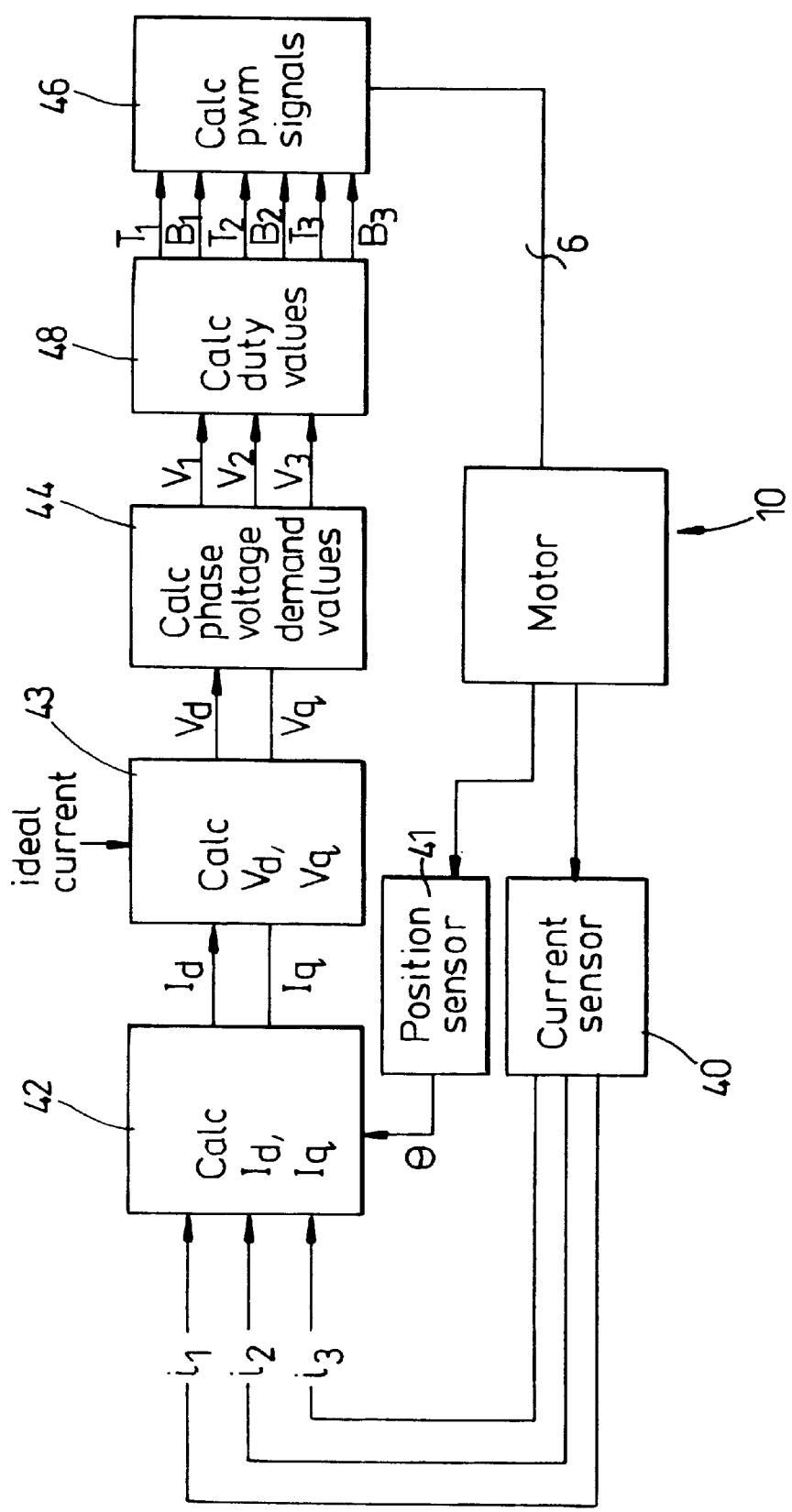
FIG. 2 illustrates the various process steps used to control the motor shown in FIG. 1.

In essence the control strategy has five main steps as set out in FIG. 2. Firstly, the three phase currents $i_1$, $i_2$, $i_3$ are measured using a current sensor 40 along with a measurement of the rotor position θ of the motor using a position sensor 41. A control algorithm is then used to generate appropriate phase voltage demands $V_1$, $V_2$, $V_3$ at 43. Each phase voltage demand corresponds to the net voltage to be applied to a respective phase of the motor. These are then used by a first processing means 45 to calculate the duty values for each phase. Finally, each phase voltage demand is then processed 46 into a respective PWM signal for the top and bottom transistors of that phase.

Figure 3A:
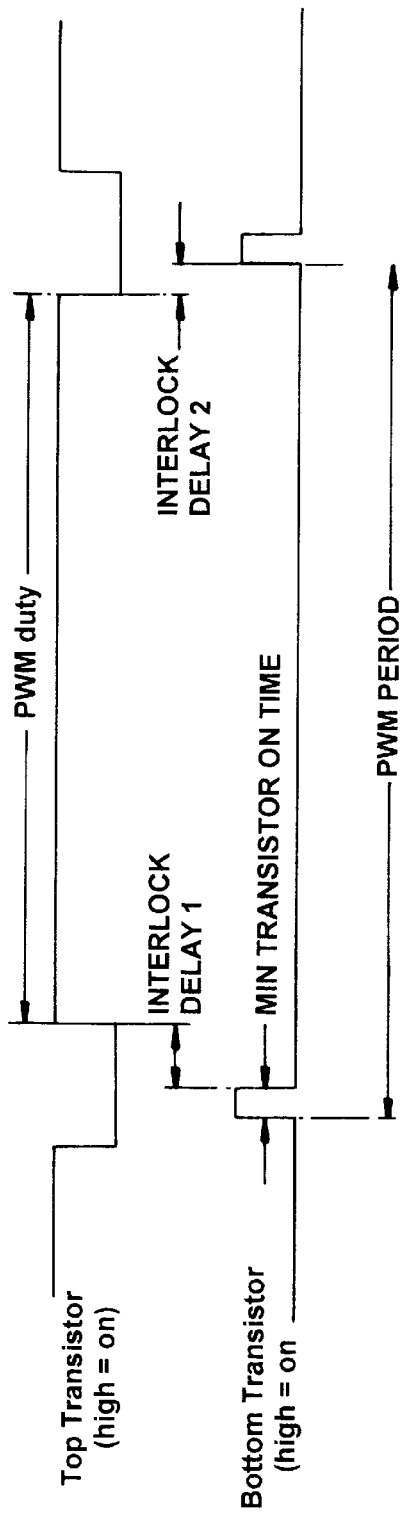
FIG. 3($a$) shows the two signals applied to the top and bottom transistors in a phase of the motor shown in FIG. 1 when the phase demand voltage is at a maximum net value.

Considering the two PWM signals applied to the top and bottom transistors of a single phase to comprise one waveform, then generally each waveform is defined by four edge positions within a PWM cycle or period. These are the points in the PWM cycle where the transistors switch from on to off and vice versa for the top transistor and the corresponding positions of the switching events for the bottom transistor. In general, when the top transistor for a phase is switched on, the corresponding bottom transistor is switched off. A typical pair of waveforms is shown in FIG. 3(a) for a maximum phase demand voltage, and FIG. 3(b) for a minimum phase demand voltage.

To enable the measurement of certain motor phase currents, the relative positioning of the edges of each phase are determined by the processing means 46 within the cycle. The time at which the motor current is to be sampled is chosen by the processing means so that the state of the six switches is known to provide a given type of current flow through the sensing means. For instance, to measure zero current so as to enable the current sense resistor circuit to be calibrated, all top transistors should be on whilst the bottom transistors are off or vice versa at the sample time. The exact location of each of the twelve edges and the timing of the samples is controlled by the processing means as described hereinafter.

The three phase voltage demands $V_1$, $V_2$, $V_3$ are then sorted by value and allocated a case number in accordance with one of the six resultant possible combinations. Essentially, the phase corresponding to the highest normalised phase demand voltage is labelled as phase A, the next as phase B and the lowest as phase C. This step simplifies the calculation of the edge positions for the PWM waveforms.

Each of the phase voltage demands is then normalised with respect to half of the measured supply voltage. If the supply voltage measurement is not available then a nominal value is used instead.

Having calculated the normalised phase demand voltage, the PWM duty values for the three phases are calculated.

Figure 3B:
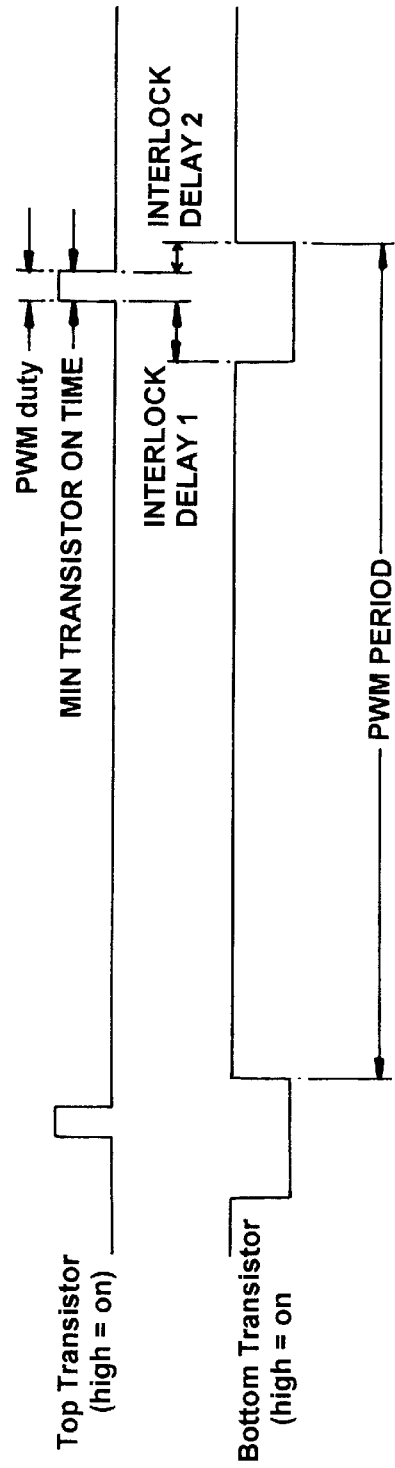

If the normalised voltage demand exceeds 1, the PWM duty is set to PWM max (i.e. maximum output) as shown in FIG. 3(a). If it is less than minus one, the PWM duty is set to PWM min (i.e. minimum duty) as shown in FIG. 3(b). If it lies between−1 and+1 it is defined by:

PWM duty=min pwm duty+{[normalised voltage demand+1]×(max pwm duty−min pwm duty)]÷2}

The PWM duty for a phase defines the ratio of on-time to off-time for the top transistor of that phase i.e. the delay time between the OFF-ON edge and the ON-OFF edge position. The on-time for the bottom transistor of the phase is then calculated from the on-time of the top transistor and the interlock requirements of the transistors.

Figure 4:
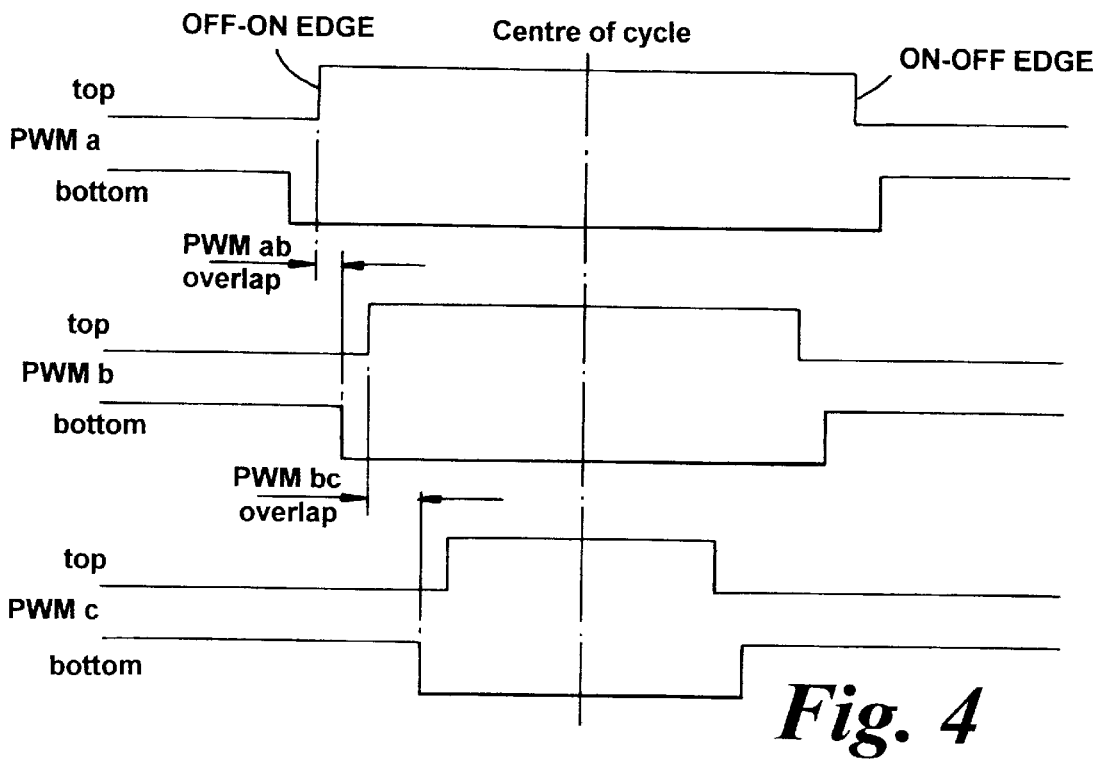
FIG. 4 shows the position of all six phase signals after centre aligning and ordering by magnitude.

Having calculated the duty period for each transistor, the location of the edges within a cycle is next calculated. Initially, all six signals are centre aligned so that the centre of each on period of the top transistors and the centre of each off period for the bottom transistors is aligned with the centre of the cycle as shown in FIG. 4.

After centre aligning, various shifts of each of the six PWM signals are made to allow appropriate phase current measurements to be made across the single sense resistor. Where possible the shifts are chosen so that there will be at least one point in a cycle whereby all the top transistors are on and the bottom transistors are off. Alternatively, the shifts are chosen so that there is at least one point in each cycle where all the top transistors are off and all the bottom transistors are on. Ideally, the waveforms are shifted so that both the conditions arise in a single cycle. However, depending on the waveforms this may not be possible. If so, a flag is raised to prevent erroneous current measurement samples being taken.

The purpose of ensuring the top three transistors are off and the bottom are switched on (or vice versa) at an instant in the cycle is to enable a sample from the single current sense resistor circuit 30 to be taken when it is known that zero current is flowing through the current sense resistor. A non-zero sample value can then be used to calculate and compensate for any offset in the current sensing circuit since this provides a measure of thermal drift or ageing of components. By sampling and updating on each cycle (if possible and assuming no flag is raised), a regular correction can be made to prevent drift over time.

The following method is used to position the signals within each cycle. Each PWM edge is defined by its position within the PWM cycle. The earliest position in the cycle at which an edge can lie is defined as MIN EDGE POSITION. The latest is defined as MAX EDGE POSITION. The following relationship holds:

MAX EDGE POSITION−MIN EDGE POSITION=PWM PERIOD−MIN TRANSISTOR ON-TIME:

MIN TRANSISTOR ON TIME is defined as the minimum length of time during each PWM cycle that each top transistor will be on and each bottom transistor will be on.

A centre position is also defined as:

centre of cycle=[MAX EDGE POSITION+MIN EDGE POSITION+(INTERLOCK DELAY 1−INTERLOCK DELAY 2)÷2

This ensures that the bottom transistor edges will initially be centred between the MIN EDGE POSITION and MAX EDGE POSITION regardless of the duty and the interlock delays.

Having defined a suitable reference above, the position of each edge can be calculated. The four definitions below can be used:

| | |
|---|---|
| top edge 1 | the position at which the top transistor turns on |
| top edge 2 | the position at which the top transistor turns off |
| bottom edge 1 | the position at which the bottom transistor turns off |
| bottom edge 2 | the position at which the bottom transistor turns on |

The following algorithm is then used to calculate the edge positions for he centre-aligned PWM waveforms:
For phase a:

centred PWM edges a. top edge 1=centre of cycle−(PWM duty a÷2)

centred PWM edges a. top edge 2=centred PWM edges a. top edge1+PWM duty a centred PWM edges a. bottom edge 1=centred PWM edges a. top edge 1−INTERLOCK DELAY 1 centred PWM edges a. bottom edge 2=centred PWM edges a. top edge 2+INTERLOCK DELAY 2

For phase b:

centred PWM edges b. top edge 1=centre of cycle−(PWM duty b÷2)

centred PWM edges b. top edge 2=centred PWM edges b. top edge 1+PWM duty b centred PWM edges b. bottom edge 1=centred PWM edges b. top edge 1−INTERLOCK DELAY 1 centred PWM edges b. bottom edge 2=centred PWM edges b. top edge 2+INTERLOCK DELAY 2 and for phase c:

centred PWM edges c. top edge 1=centre of cycle−(PWM duty c÷2 centred PWM edges c. top edge 2=centred PWM edges c. top edge 1+PWM duty c centred PWM edges c. bottom edge 1=centred PWM edges c. top edge 1−INTERLOCK DELAY 1 centred PWM edges c. bottom edge 2=centred PWM edges c. top edge 2+INTERLOCK DELAY 2

Having defined the position of each edge relative to the Centre, the required edge shifts can be calculated. The shifts are chosen (where possible) to provide two instants for measuring zero current, and two instants for measuring current in at least two phases individually. As a rule, the minimum overlap regions are given a width of at least MIN PWM WAVEFORM OVERLAP. This is generally chosen to be the time allowed to let the current sensor resistor circuit "settle" to give sufficient time for a sample to be taken. In this example, the two current samples correspond to the current flowing into phase A and the current flowing out of phase C.

The steps for calculating the relative edge positions are as follows:
Step 1. Calculate overlaps already present with centre-aligned PWM waveforms:

PWM ab overlap=centred PWM edges b. bottom edge 1−centred PWM edges a. top edge 1

PWM bc overlap=centred PWM edges c. bottom edge 1−centred PWM edges b. top edge 1

PWM total overlap=PWM ab overlap+PWM bc overlap

Step 2. Calculate required PWM a and PWM c shift. PWM a is shifted towards the start of the cycle (i.e. shift will be−ve). PWM c is shifted towards the end of the cycle (i.e. shift will be+ve). If the total overlap is large enough already no shift is required.

IF PWM total overlap<(MIN PW WAVEFORM OVERLAP×2) THEN

PWM A SHIFT=−[(MIN PWM WAVE FORM OVERLAP×2)−PWM total overlap]÷2

PWM C shift=[(MIN PWM WAVEFORM OVERLAP×2)−PWM total overlap]+PWM A shift
    ELSE
    PWM A SHIFT=0
    PWM C SHIFT=0
    ENDIF Step 3. Calculate required PWM B shift. PWM B can be shifted in either direction to ensure that both overlaps are large enough. This step takes account of shifts applied to PWM A and PWM C in Step 2.

IF [(PWM AB overlap−PWM A shift)≦(PWM BC overlap+PWM C shift)] THEN

IF [PWM AB overlap−PWM A shift)<MIN PWM WAVEFORM OVERLAP] THEM

PWM B shift=MIN PWM WAVEFORM OVERLAP−(PWM AB overlap−PWM A shift)

ELSE
PWM B shift+0
ENDIF
ELSE

IF (PWM BC overlap+PWM C Shift)<MIN PWM WAVEFORM OVERLAP] THEN

PWM B shift=(PWM BC overlap+PWM C shift)−MIN PWM WAVEFORM OVERLAP

ELSE
PWM B shift=0
ENDIF
ENDIF

Figure 5:
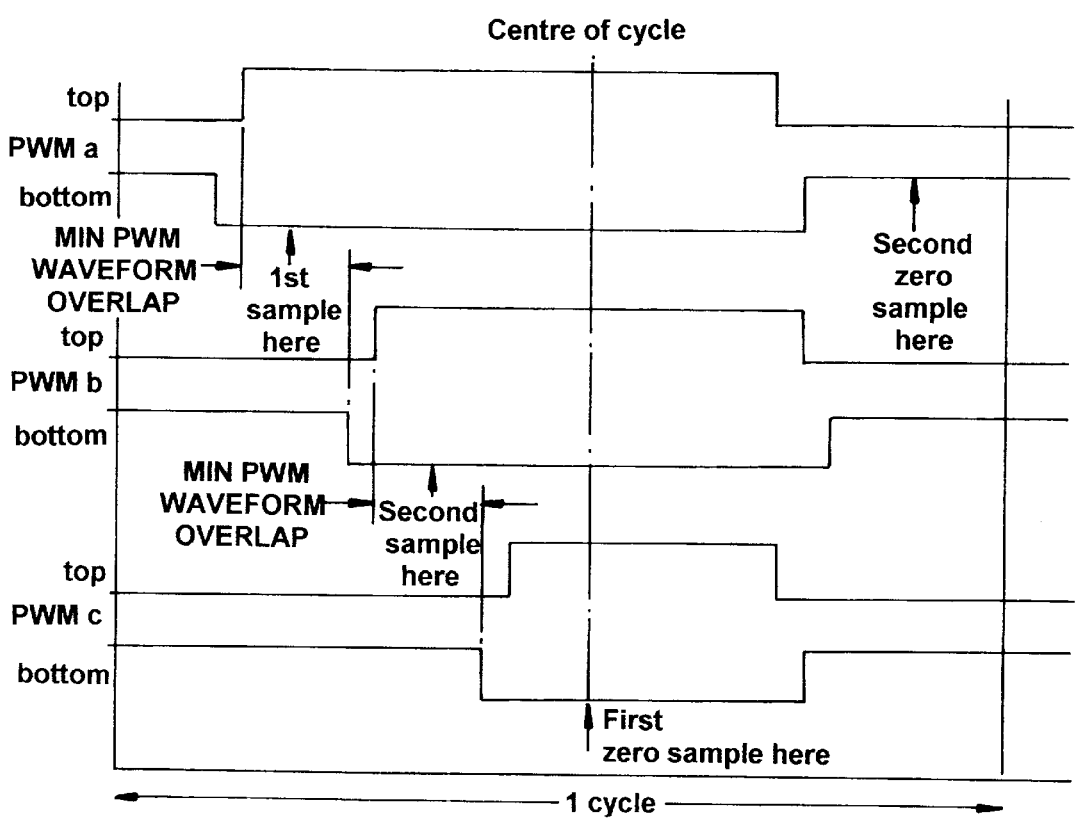
FIG. 5 shows the relative positions of the twelve edges after shifting to enable appropriate current measurement to be taken.

The position of the signals of FIG. 4 after the shift have been applied are shown in FIG. 5. The key points to note are that 1) The PWM duty for each transistor has remained the same, i.e. the delay time between the two edges of each signal
2) The order of the edges in the second half of the cycle (i.e. after cycle centre) may have changed.
3) Generally, for each transistor one edge is in the first half of the cycle and the other is in the second half.
4) The two signals for a phase (i.e. top and bottom for an arm of the circuit) are shifted together in the same direction and by the same amount.

Having shifted the edges, the instants at which of the appropriate current samples can be taken are selected. Up to four samples are taken in each cycle. Of these, two samples are always taken, representing two motor phase currents.

The first sample measures current flowing into motor phase A and the second measures current flowing out of phase C. Two zero current samples are taken where possible. Depending on the combinations of PWM waveforms, this may not be possible during every cycle and so a flag is raised if not possible.

Each sample is taken as late as possible within an overlap region. This is calculated as the analogue to digital converter sample time before the end of the sampling region.

The position for each sample to be taken is then calculated according to:

Step 1. Calculate sample position for motor phase current samples:

motor current A sample position+PWM edges B. bottom edge 1−adc sample time motor current C sample position+PWM edges C. bottom edge 1−adc sample time Step 2. Check conditions for zero current sample with bottom transistors on and calculate sample position:

IF (PWM edges A. bottom edge 1−min edge position)≧MIN PWM WAVEFORM OVERLAP THEN motor bottom zero current sample position PWM edges A. bottom edge 1−adc sample time motor bottom zero current sample valid=TRUE

ELSE motor bottom zero current sample valid=FALSE

Step 3. Check conditions for zero current sample with top transistors on and calculate sample position.

IF (centre of cycle−PWM edges C. top edge 1)≧MIN PWM WAVEFORM OVERLAP THEN motor top zero current sample position=centre of cycle−adc sample time motor top zero current sample valid=TRUE

ELSE motor top zero current sample valid=FALSE

Ideally, four samples are taken on each cycle. Alternatively, each of the four samples may be taken in turn from a batch of cycles. In general, motor bottom zero current sample position always occurs first in the PWM cycle, followed by motor current A sample position, followed by motor current C sample position, followed by motor top zero current sample positions last in the cycle.

The measured samples for the motor phase A and motor phase C are then re-allocated to physical motor phases in a reverse of the process used for deciding the case number.

The current in the third phase can be calculated by knowing that the sum of the three phase currents must be zero.

Thus three phase currents are known and this information is used as feedback for the closed loop motor current controller 43 in FIG. 2.

From the top zero current sample and bottom zero current sample, the offsets in the current sense circuit can be calculated. This is preferably achieved by separately filtering streams of top zero current samples and bottom zero current samples using a first order (digital) low pass filter. The two filtered values are then averaged. The average value is subtracted from every sample of motor phase A current and motor phase C current to give offset-corrected values. Of course, in place of a single current sense resistor, any other appropriate form of current sensor can be used.

We claim:

1. A method of monitoring the operation of a brushless motor comprising a number of phases, each of said phases comprising one or more windings connected in a bridge circuit, said bridge circuit comprising a number of arms with one of said arms for each phase, each said arm comprising a top switching device connected between said phase and a first supply voltage and a bottom switching device connected between said phase an a second, different, supply voltage, each of said switching devices being switchable from an on state to an off state wherein the method comprises the steps of:

monitoring current flowing into or out of said windings using a current measurement means to produce an output signal indicative of said current;

controlling said motor by applying suitable signals to each switching device such that the instantaneous current flow through said current measurement means is substantially zero;

measuring the value of an output signal of said current measurement means when said instantaneous current flow through said current measurement means is substantially zero;

and producing a modified output signal which is compensated for any differences between the measured value and that indicative of zero current.

2. A method according to claim 1 wherein said current measuring means comprises a single sense resistor and means to measure the voltage across it.

3. A method according to claim 1 which further includes a step of adding an offset value to said output signal from said current measurement means or subtracting an offset value from said output signal of said current measurement means to produce said modified output signal.

4. A method according to claim 1 wherein a respective signal applied to each of said switching devices comprises a pulse width modulated signal.

5. A method according to claim 4 wherein all said switching devices are modulated by respective pulse width modulated signals that have a synchronised modulation cycle time.

6. A method according to claim 4 wherein said signals are chosen so that during each or selected pulse width modulation cycles the instantaneous current into or out of said motor is zero at a first instant independent of the net current in said cycle.

7. A method according to claim 6 wherein a pulse width modulated signal applied to each switching device is defined by a single ON-OFF transition and a single OFF-ON transition or edge within each cycle, and in which all said top devices are switched on whilst all said bottom devices are switched off for at least said first instance.

8. A method according to claim 6 in which at said first instance all said top switching devices are switched off whilst said bottom switching devices are switched on.

9. A method according to claim 4 which further includes the step of aligning said signals for each switching device so that one of (i) the on periods of each top switching device and the off periods of each bottom switching device and (ii) the off periods of each top switching device and the on periods of each bottom switching device during each cycle are centre aligned so that the two edges of each signal are spaced equally either side of an arbitrarily chosen point in the cycle.

10. A method according to claim 9 wherein said signals are centred around the centre of said cycle.

11. A method according to claim 9 which further comprises shifting the edges of one or more of said signals within said cycle so that they are overlapped in a manner suitable to enable two additional current samples to be taken, each corresponding to the current in a single phase of the motor.

12. A method according to claim 11 wherein said signals for said top and bottom switching device in a phase are not shifted relative to each other.

13. A method according to claim 12 wherein the two signals corresponding to the highest phase voltage are not shifted whilst one or more of the other pairs of signals are shifted.

14. A method of controlling a motor comprising a number of phases, each phase being connected to a first voltage through a top switching device and to a second voltage through a bottom switching device, the method comprising the steps of:

calculating a respective phase voltage demand value for each phase of said motor indicative of a net voltage to be applied to said phase;

calculating a duty period value of a pulse width modulated signal for said top switching device and a duty period value of a pulse width modulated signal for said bottom switching device of each phase needed to apply a net voltage to said phase corresponding to said phase voltage demand value;

processing said duty period value to define for each phase a time delay between a first switching edge for said top switching device where it is switched from an off state to an on state and a second switching edge for said top switching device where it is switched back to the off state and a time delay between a third switching edge for said bottom switching device where it is switched from an on state to an off state and a fourth switching edge for said bottom switching device where it is switched back to said on state, the position of said edges defining a cycle of a PWM signal;

calculating the positions of said edges of said signals for one phase relative to said edges of said signals for said other phases so that at a first instance a current flowing into or out of said motor is indicative of the current in a single phase and at a second instance the current flowing in said motor is indicative of the current flowing in a second, different, phase; and modulating each switching device with its respective PWM signal.

15. A method according to claim 14 wherein said edges within a cycle are positioned relative to each other so that at a third instance substantially zero current is flowing through said current measurement means.

16. A method according to claim 15 wherein a t said third instance all said top switching devices are switched on whilst said bottom switching devices are switched off.

17. A method according to claim 14 wherein said edges are aligned so that at a fourth instance all said to p switching devices are switched off whilst said bottom switching devices are switched on.

18. A method according claim 17 which further comprises the steps of taking two zero current samples, one when all said top transistors are switched on and the other when said top transistors are switched off, and from which two streams of data corresponding to zero current are generated.

19. A method according to claim 18 wherein each stream of data is separately filtered and averaged to allow a compensating value to track changes in the zero output of said current measurement circuit.

20. A method according to claim 14 which further comprises an intermediate step of initially centre aligning each PWM signal within a cycle so that said first and second edges of said signal are spaced equally about an arbitrarily chosen point in the cycle.

21. A method according to claim 20 wherein after centre aligning, said waveforms for the phase with the highest demand voltage are kept centre aligned whilst one or more of the other two waveforms are shifted to achieve the desired edge overlap.

22. A method according to claim 15 which comprises a further step of taking at least one current sample during a cycle corresponding to either of said first, second, third or fourth instants.

23. A method according to claim 22 in which a sequence of current samples are taken from within a single cycle, said sequence consisting of one sample from each of the first, second, third and fourth instants.

24. A method according to claim 21 in which said edges are shifted so that a first instant said top and bottom switching means of one phase are in the opposite state to those of the remaining phases and at a second instant, said top and bottom switching devices of a different phase are in a different state to the top and bottom switching means of the remaining phases.

* * * * *